(No Model.)

W. WOOD.
ROCK DRILL ROTATING DEVICE.

No. 505,242. Patented Sept. 19, 1893.

WITNESSES:
Wm. J. Bell.
J. M. Robertson.

INVENTOR:
Warren Wood

BY
Gartner & Co
ATTORNEYS.

UNITED STATES PATENT OFFICE.

WARREN WOOD, OF PATERSON, NEW JERSEY, ASSIGNOR TO SAMUEL G. McKIERNAN, OF SAME PLACE.

ROCK-DRILL-ROTATING DEVICE.

SPECIFICATION forming part of Letters Patent No. 505,242, dated September 19, 1893.

Application filed May 10, 1893. Serial No. 473,654. (No model.)

*To all whom it may concern:*

Be it known that I, WARREN WOOD, a citizen of the United States, residing in Paterson, county of Passaic, and State of New Jersey, have invented certain new and useful Improvements in Rock-Drill-Rotating Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a new and useful improvement in rock drills, particularly to the rotating device therefor, and it consists in the head of the drill rotating bar having a series of teeth on its periphery and of a collar placed around said head and provided with a series of pawls, adapted to engage said teeth to prevent the rotation of the drill bar in one direction.

It consists also in a plate placed between the head of the drill bar and the cylinder head, designed to relieve the torsional strain on the cylinder head caused by the attempt of the drill bar to rotate against the action of the pawls.

It consists further in the combination and arrangement of parts substantially as hereinafter described and claimed.

The invention is illustrated in the accompanying drawings, in which—

Figure 1:
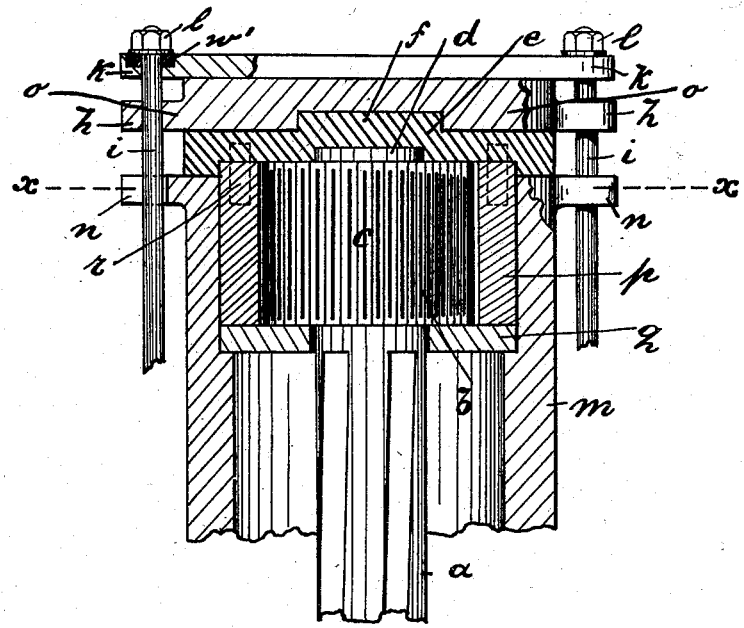
Figure 2:
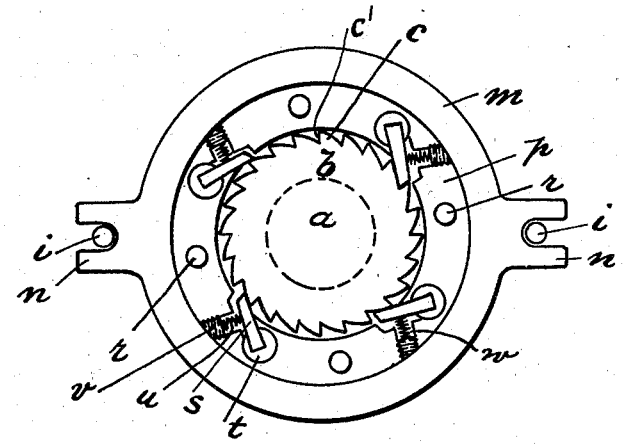

Figure 1 is a vertical cross section of the upper portion of a rock drill cylinder and of the drill rotating bar embodying my invention. Fig. 2 is a view corresponding to a section taken on the line $x$—$x$, of Fig. 1, the section lines being omitted.

In said drawings $a$ represents the drill rotating bar, $b$ the head thereof, in the periphery of which the vertically-arranged teeth $c$ are cut. The face $c'$ of these teeth is cut preferably away from the radial line from the center of the head. The head $b$ is also provided above the teeth with a central cylindrical projection $d$ forming a bearing for the head $b$, against the cylinder head or an interposed plate as will be hereinafter more fully described.

The head $b$ of the drill rotating bar is supported upon a washer $q$ which rests on suitable flanges on the interior of the cylinder $m$. Around the head $b$ and also supported upon said washer $q$ is placed a collar $p$ of a depth approximately the depth of the toothed surface of the head $b$. Placed vertically in this collar $p$ is a series of pins $t$ grooved to receive the pawls $s$ having the ends extending to and in engagement with the teeth $c$ of the head $b$. The pins $t$ and pawls $s$ are of a length corresponding to the length of the teeth $c$. The beveled face of pawls $s$ is held against the teeth $c$ by means of a spring $u$ placed in a suitable recess $w$ arranged in the walls of the collar $p$ substantially as shown in Fig. 2 of the drawings. If desired the recesses may extend through the walls of said collar and screw plugs $v$ may be placed in the outer ends to confine the springs $u$ between the plugs $v$ and pawls $s$ and also to regulate the tension of said springs $u$ as will be manifest.

Above the head $b$ of the drill rotating bar and resting thereon and also on the collar $f$ and the walls of the cylinder $m$ is placed the substantially circular plate $e$ formed on its under surface with a circular recess adapted to receive the circular projection $d$ of the head $b$ and to form a bearing therefor. This plate $e$ is secured to the collar $p$ preferably by means of pins $r$ extending into recesses in the collar and plate substantially as shown in the drawings. On the upper surface and approximately at the center of this plate $e$ is formed a cylindrical or circular projection $f$ for the purpose hereinafter described.

Above the plate $e$ is placed the top plate or cylinder head $o$ having on its under surface a cylindrical recess fitting over the circular projection $f$ of the plate $e$ and forming a bearing for said plate $e$. The cylinder head $o$ is clamped down into place by a strap of metal $k$ placed over the head $o$ and held in position by means of the bolts $i$ and tightening nuts $l$ substantially as shown in Fig. 1. The bolts $i$ pass from end to end of the cylinder through eyes in the strap $k$ and flange $h$ of the cylinder head and through guide lugs $n$ projecting from the cylinder $m$. If desired a cushion of elastic material $w'$ may be placed under the nut $l$ and in a suitable recess in the ends of the strap $k$ substantially as shown in Fig. 1 of the drawings.

In assembling the parts together the drill rotating bar is placed inside the cylinder with the head supported upon the washer $q$. The collar is then placed around the head. The plate $e$ is then placed down upon the head and collar and secured to the said collar by the pins. The cylinder head is next placed upon the plate and strapped or clamped down by the strap $k$ and the bolts $i$ and tightening nuts $l$. When properly clamped together and under ordinary strain the drill rotating bar is allowed to rotate in one direction (the pawls sliding over the teeth on the drill bar head) but is prevented from turning in the opposite direction by the pawls engaging the teeth of the drill bar head and locking the same to the collar. The collar, being secured to the plate, cannot rotate in either direction without turning said plate and as said plate is tightly clamped down by the cylinder head, it will not rotate unless under the influence of a sudden and extraordinary strain brought to bear upon it through the collar. On such an emergency the plate and collar will be allowed to slip a little—the plate turning on its bearing against the cylinder head. Heretofore, where the locking device for the drill rotating bar has been secured directly to the cylinder head, this sudden and extraordinary strain has been brought directly upon said cylinder head, and as said cylinder head was (by reason of the bolts and nuts) prevented from rotating even a small distance, the cylinder head was frequently broken by said twisting strain and the cylinder thereby rendered useless. For this reason the plate $e$ acts as a releasing or relieving device and prevents, under any and all circumstances injury to the cylinder head and also to the rotating device from the twisting of the drill rotating bar.

I do not wish to confine myself to the precise form of releasing plate shown, as any plate interposed between the end of the cylinder and the cylinder head and adapted to turn, under extraordinary strain, upon the cylinder head as a bearing, will accomplish the purpose sought to be covered in the present improvement.

One feature of the present invention also resides in the arrangement of the pawls $s$ in relation to the teeth $c$ of the head $b$. I prefer to use four of said pawls, so arranged that only one at a time will be in engagement with the face of one tooth. The other pawls are so arranged that the next succeeding one will rest on the edge of the tooth one quarter the pitch of the tooth from the face, the next tooth thereafter one-half and the third three-quarters. By reason of this arrangement the back lash or back play of the teeth with the pawls is reduced to one quarter the pitch of the tooth as will be manifest. I have illustrated this feature particularly in Fig. 2 of the drawings.

It is obvious that I may use two or more teeth in accordance with this arrangement and I do not desire to be limited to any number shown or described.

Having thus described my invention, what I claim as new, and desire to secure by Letters Patent, is—

1. In a rock-drill the combination of a drill rotating bar, the cylinder and the cylinder head, with a releasing plate clamped between the ends of the cylinder and the cylinder head and having a bearing in said cylinder head, said releasing plate forming a bearing for the head of the drill rotating bar, and with means substantially as described for locking said releasing plate to the head of said drill bar to prevent the drill bar from rotating in one direction, all arranged so that said drill bar and releasing plate when locked, will under abnormal strain rotate upon the cylinder head as a bearing, substantially as described.

2. In a rock-drill the combination of the cylinder and the cylinder head, and the drill rotating bar having an enlarged notched head, with a collar surrounding said notched head and provided with a series of pawls adapted to engage the notched head of the drill rotating bar to prevent the same from turning in one direction, and with the releasing plate united to said collar and furnishing a bearing for the head of the drill rotating bar, said releasing plate being clamped between the end of the cylinder and the cylinder head and unable to move therein except under abnormal torsion of the drill bar head and its collar, substantially as described.

In testimony that I claim the foregoing I have hereunto set my hand this 9th day of May, 1893.

WARREN WOOD.

Witnesses:
HENRY E. EVERDING,
WM. D. BELL.